United States Patent
Ohba et al.

(10) Patent No.: US 8,160,021 B2
(45) Date of Patent: Apr. 17, 2012

(54) MEDIA-INDEPENDENT HANDOVER: SESSION IDENTIFIER

(75) Inventors: Yoshihiro Ohba, Fort Lee, NJ (US); Subir Das, Kendall Park, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 811 days.

(21) Appl. No.: 11/558,922

(22) Filed: Nov. 12, 2006

(65) Prior Publication Data

US 2007/0183365 A1  Aug. 9, 2007

Related U.S. Application Data

(60) Provisional application No. 60/766,715, filed on Feb. 7, 2006.

(51) Int. Cl.
*H04W 36/00* (2009.01)
*H04W 4/00* (2009.01)
(52) U.S. Cl. ......... 370/331; 455/436; 370/338; 370/328
(58) Field of Classification Search ............... 370/331, 370/338, 466, 328, 392, 254; 455/436, 439, 455/442, 435.1, 435.2; 380/272; 379/60; 709/225, 217
See application file for complete search history.

(56) References Cited

U.S. PATENT DOCUMENTS

| | | | |
|---|---|---|---|
| 7,515,561 B2 * | 4/2009 | Koodli et al. | 370/331 |
| 2006/0030320 A1 * | 2/2006 | Tammi et al. | 455/435.2 |
| 2006/0140150 A1 * | 6/2006 | Olvera-Hernandez et al. | 370/331 |

OTHER PUBLICATIONS

Hyun-Ho Choi, A Seamless Handoff Scheme for UMTS-WLAN Interworking, IEEE Communication Society, Globecom 2004.*
C. Perkins, IP Mobility Support for IPv4, Aug. 2002, p. 1-93, The Internet Society, USA.
D. Johnson, Mobility Support in IPv6, Jun. 2004, p. 1-155, The Internet Society, USA.
K. El Malki, Low-Latency Handoffs in Mobile IPv4, Jun. 2007, p. 1-60, The Internet Society, USA.
R. Koodli, Fast Handovers for Mobile IPv6, Jul. 2005, p. 1-40, The Internet Society, USA.
M. Liebsch, Candidate Access Router Discovery, Jul. 2005, p. 1-46, The Internet Society, USA.
J. Loughney, Context Transfer Protocol, Jul. 2005, p. 1-33, The Internet Society, USA.
B. Aboba, Extensible Authentication Protocol, Key Management Framework, Nov. 11, 2007, p. 1-73, Internet Draft, USA.
P. Jayaraman, Protocol for Carrying Authentication for Network Access Framework, May 2008, p. 1-11, The Internet Society, USA. S. Park, Rapid Commit Option for the Dynamic Host Configuration Protocol version 4, Mar. 2005, p. 1-10, The Internet Society, USA.
T. Kivinen, Design of the IKEv2 Mobility and Mulithoming Protocol, Aug. 2006, p. 1-29, The Internet Society, USA.
R. Moskowitz, Host Identity Protocol, May 15, 2003, p. 1-53, Internet Draft, USA.

* cited by examiner

*Primary Examiner* — Un C Cho
*Assistant Examiner* — Nizar Sivji
(74) *Attorney, Agent, or Firm* — Westerman, Hattori, Daniels & Adrian, LLP

(57) ABSTRACT

A system for media independent handover using a session identifier in which a session identifier is used for identifying a media independent handover registration session across different MIH transport instances between a pair of communicating MIHFs. A point of service maintains a single registration state for a mobile node across the multiple transport instances. A session identifier is assigned by a point of service at the time of initial registration, and is valid only during the lifetime of the registration. A registration state includes local handles to transport instances that are used when sending and receiving media independent handover messages related to the registration.

23 Claims, 1 Drawing Sheet

MEDIA-INDEPENDENT HANDOVER: SESSION IDENTIFIER

This application claims the benefit of U.S. Provisional Patent Application No. 60/766,715 filed Feb. 7, 2006, entitled Media-Independent Handover: Session Identifier, the entire disclosure of which is incorporated herein by reference, as though recited in full.

BACKGROUND

1. Field of the Invention

The present application relates to, inter alia, methods for network discovery mechanisms, including, e.g., methods for network discovery mechanisms for secure fast handoff and the like.

2. Background Applications

The entire disclosure of U.S. Provisional Patent Application No. 60/649,554 filed Feb. 4, 2005, entitled A Framework Of Media-Independent Pre-Authentication and of U.S. application Ser. No. 11/307,362 also A Framework Of Media-independent Pre-Authentication entitled filed on Feb. 2, 2006 are incorporated herein by reference. In addition, the present application incorporates by reference the entire disclosures of each of the following U.S. Provisional Patent Applications: 1) Ser. No. 60/625,106, filed on Nov. 5, 2004, entitled Network Discovery Mechanism For Secure Fast Handoff, 2) Ser. No. 60/593,377, filed on Jan. 9, 2005, entitled Network Discovery Mechanisms; 3) Ser. No. 60/670,655, filed on Apr. 13, 2005, entitled Network Discovery Mechanisms; and 4) Ser. No. 60/697,589, filed on Jul. 11, 2005, entitled RDF Schema Update for 802.1 Baseline Document. In addition, the entire disclosure of the following co-pending Utility U.S. patent application is incorporated herein by reference: U.S. patent application Ser. No. 10/761,243 entitled Mobility Architecture Using Pre-Authentication, Pre-Configuration and/or Virtual Soft-Handoff, filed on Jan. 22, 2004.

BACKGROUND DISCUSSION

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another devices a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level routers can look at, e.g., a set of bits identifying a particular subnet. Then, at a subnet level routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

The preferred embodiments improve upon technologies described, e.g., in the following references, each of which references listed below is incorporated herein by reference in its entirety:

1. Perkins, C., "IP Mobility Support for IPv4", RFC 3344, August 2002. Referred to herein as [RFC3344].
2. Johnson, D., Perkins, C. and J. Arkko, "Mobility Support in IPv6", RFC 3775, June 2004. Referred to herein as [RFC3775].
3. Malki, K., "Low latency Handoffs in Mobile IPv4", draft-ietf-mobileip-lowlatency-handoffs-v4-09 (work in progress), June 2004. Referred to herein as [I-D.ietf-mobileip-lowlatency-handoffs-v4].
4. Koodli, R., "Fast Handovers for Mobile IPv6", draft-ietf-mipshop-fast-mipv6-03 (work in progress), October 2004. Referred to herein as [I-D.ietf-mipshop-fast-mipv6].
5. Liebsch, M., "Candidate Access Router Discovery", draft-ietf-seamoby-card-protocol-08 (work in progress), September 2004. Referred to herein as [I-D.ietf-seamoby-card-protocol].
6. Loughney, J., "Context Transfer Protocol", draft-ietf-seamoby-ctp-11 (work in progress), August 2004. Referred to herein as [I-D.ietf-seamoby-ctp].
7. Aboba, B., "Extensible Authentication Protocol (EAP) Key Management Framework", draft-ietf-eap-keying-04 (work in progress), November 2004. Referred to herein as [I-D.ietf-eap-keying].
8. Forsberg, D., Ohba, Y., Patil, B., Tschofenig, H. and A. Yegin, "Protocol for Carrying Authentication for Network Access (PANA)", draft-ietf-pana-pana-07 (work in progress), December 2004. Referred to herein as [I-D.ietf-pana-pana].
9. Kim. P., Volz, B. and S. Park, "Rapid Commit Option for DHCPv4", draft-ietf-dhc-rapid-commit-opt-05 (work in progress), June 2004. Referred to herein as [I-D.ietf-dhc-rapid-commit-opt].
10. ITU-T, "General Characteristics of International Telephone Connections and International Telephone Cirsuits: One-Way Transmission Time." Referred to hearin as [RG98].
11. ITU-T, "The E-Model, a computational model for use in transmission planning," Referred to herein as [ITU98].
12. ETSI, "Telecommunications and Internet Protocol Harmonization Over Networks (TIPHON) Release 3: End-to-end Quality of Service in TIPHON systems; Part 1: General Aspects of Quality of Service." Referred to herein as [ETSI].
13. Kivinen, T. and H. Tschofenig, "Design of the MOBIKE protocol," draft-ietf-mobike-design-01 (work in progress), January 2005. Referred to herein as [I-D.ietf-mobike-design].
14. Moskowitz, R., "Host Identity Protocol", draft-ietf-hip-base-01 (work in progress), October 2004. Referred to herein as [I-D.ietf-hip-base].
15. Almes, G., Kalidindi, S. and M. Zekauskas, "A One-way Delay Metric for IPPM", RFC 2679, September 1999. Referred to herein as [RFC2679].
16. Almes, G., Kalidindi, S. and M. Zekauskas, "A One-way Packet Loss Metric for IPPM", RFC 2680, September 1999. Referred to herein as [RFC2680].
17. Almes, G., Kalidindi, S. and M. Zekauskas, "A Round-trip Delay Metric for IPPM", RFC 2681, September 1999. Referred to herein as [RFC2681].
18. Simpson, W., "IP in IP Tunneling", RFC 1853, October 1995. Referred to herein as [RFC1853].
19. Patrick, M. "DHCP Relay Agent Information Option", RFC 3046, January 2001. Referred to herein as [RFC3046].
20. Schulzrine, H., "Application Layer Mobility Using SIP." Referred to herein as [SIPMM].
21. Yegin, A., "Supporting Optimized Handover for IP Mobility-Requirements for Underlying Systems", draft-manyfolks-I2-mobilereq-02 (work in progress), July 2002. Referred to herein as [I-D.manyfolks-I2-mobilereq].
22. Cambell, A., Gomez, J., Kim, S., Valko, A. and C. Wan, "Design, Implementation, and Evaluation of Cellular IP." Referred to herein as [CELLIP].
23. Ramjee, R., Porta, T., Thuel, S., Varadhan, K. and S. Wang, "HAWAII: A Domain-based Approach for Supporting Mobility in Wide-area Wireless networks." Referred to herein as [HAWAII].
24. Das, S., Dutta, A., Misra, A. and S. Das, "IDMP: An Intra-Domain Mobility Management Protocol for Next Generation Wireless Networks." Referred to herein as [IDMP].
25. Calhoun, P., Montenegro, G., Perkins, C. and E. Gustafsson, "Mobile IPv4 Regional Registration", draft-ietf-mobileip-reg-tunnel-09 (work in progress), July 2004. Referred to herein as [I-D.ietf-mobileip-reg-tunnel].
26. Yokota, H., Idoue, A. and T. Hasegawa, "Link Layer Assisted Mobile IP Fast Handoff Method over Wireless LAN Networks." Referred to herein as [YOKOTA].
27. Shin, S., "Reducing MAC Layer Handoff Latency in IEEE 802.11 Wireless LANs." Referred to herein as [MACD].
28. Dutta, A., "Secured Universal Mobility." Referred to herein as [SUM].
29. Dutta, A., "Fast handoff Schemes for Application Layer Mobility Management." Referred to herein as [SIPFAST].
30. Gwon, Y., Fu, G. and R. Jain, "Fast Handoffs in Wireless LAN Networks using Mobile initiated Tunneling Handoff Protocol for IPv4 (MITHv4)", January 2005. Referred to herein as [MITH].
31. Anjum, F., Das, S., Dutta, A., Fajardo V., Madhani, S., Ohba, Y., Taniuchi, K., Yaqub, R. and T. Zhang, "A proposal for MIH function and Information Service", January 2005. Referred to herein as [NETDISC].
32. Dutta, A., "GPS-IP based fast-handoff for Mobiles." Referred to herein as [GPSIP].
33. [MAGUIRE] Vatn, "The effect of using co-located care-of-address on macro handover latency."

SUMMARY OF THE INVENTION

The present invention improves upon the above and/or other background technologies and/or problems therein.

A further embodiment of the present invention is the use of a session identifier is used for identifying an MIH registration session across different MIH transport instances between a pair of communicating MIHFs.

Another embodiment of the invention is a system for media independent handover using a session identifier in which a session identifier is used for identifying a media independent handover registration session across different MIH transport instances between a pair of communicating MIHFs. A point of service maintains a single registration state for a mobile node across multiple transport instances. A session identifier is assigned by a point of service at the time of initial registration, and is valid only during the lifetime of the registration. A registration state includes local handles to transport instances that are used when sending and receiving media independent handover messages related to the registration.

Another embodiment of the invention is a system for media independent handover using a session identifier, in which a point of service maintains a single registration state for a mobile node across multiple transport instances, where the transport instances are visible to the point of service. A session identifier is assigned by a point of service at the time of initial registration, and the session ID is valid only during the lifetime of the registration.

In another embodiment of the system for media independent handover using a session identifier in accordance with the present invention, a registration state includes local handles to transport instances, and the transport instances are used when sending and receiving media independent handover messages related to the registration.

In accordance with another embodiment of the invention a mobile node or a point of service re-registers with a registrar using the SessionID assigned to the registration in order to add a new transport instance to the existing registration or delete an already associated transport instance from the existing registration.

In accordance with a further embodiment of the present invention, of media independent handover using a session identifier an "Add" indication is used for adding a new transport instance and a "Delete" indication is used for deleting a transport instance. The "Add" or "Delete" indication is carried in the re-registration request and the re-registration request is sent over the transport instance to be added or deleted.

In accordance with a further embodiment of the present invention, of media independent handover using a session identifier an "Add" indication is used for adding a new transport instance and a "Delete" indication is used for deleting a transport instance. When an "Add" or "Delete" indication is not carried in the re-registration request, at least one currently associated transport instance is replaced with the new transport instance.

In accordance with a further embodiment of the present invention, of media independent handover using a session identifier a point of service maintains a single registration state for a mobile node across multiple transport instance, where the transport instances are not visible to the point of service. A session identifier is defined that is assigned by a non-point of service media independent handover, at the time of initial registration. The session ID is globally unique so as to support multi-hop sessions.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures in which.

DESCRIPTION OF THE PREFERRED EMBODIMENTS

Figure 1:
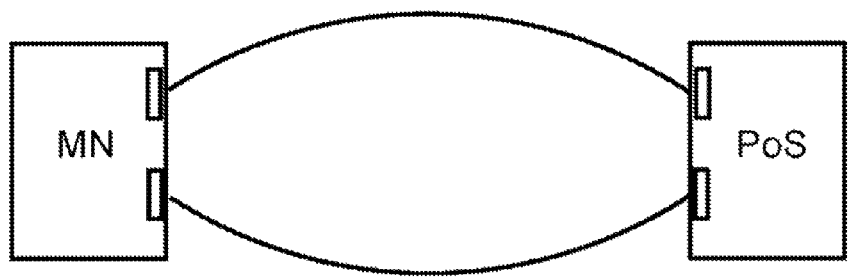
FIG. 1 is an illustrative architectural diagram related to a first case in which there is a single hop.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The following abbreviations and terminology are employed herein:

Fully Qualified Domain Name (FQND) or internal IP address.

Network access identifier (NAI).

Media Independent Handover (MIH).

Media Independent Handover Function (MIHF).

Media Independent Handover Function Identifier (MIHF ID).

The MIHF ID is used to establish an initial connection between two MIHF peers after MIHF discovery and before the creation of a session. This initial connection may be part of an initial registration process. Use of this identifier enables the MIHF protocol to be independent of changes in the transport protocol. This ID may be unique for a MIHF, or for a MIHF within a network, and may be assigned to the MIHF by the configuration process. The MIHF-ID MUST be invariant even if the device obtains different interfaces or other components in its registration lifetime.

An FQDN of the entity that creates the SessionID is the DiameterIdentity. For example, MIHF-ID may be a FQDN or NAI of the sender of the registration request. When NAI is used, the NAI MUST contain not only username part but also realm part (i.e., username@realm) to maintain global uniqueness. However, if multiple devices are associated with one NAI, it can not guarantee the uniqueness property. The ID is be used to identify an active session uniquely between two MIHF peers. This identifier is created at registration time. Multiple sessions may exist between two MIHF peers at the same time.

| Type | Length | Value |
| --- | --- | --- |
| TYPE_HDR_TLV_SESSION_ID | Variable | A unique identifier generated by the originator of the session |

A Session Identifier (Session ID) is assigned during a session establishment for remote registration. Each remote registration needs to be associated with the MIHF that keeps the registration information for particular MIH service.

| Type | Length | Value |
| --- | --- | --- |
| TYPE_Session_ID | Variable | A unique identifier generated by the source and destination and valid for a session |

A Session ID is a 32-bit random number that is unique within the pair MIHFs of the source and destination of session request. The Session ID is created jointly by the source and destination MIHF peers at the time of registration to avoid conflict at both ends. The source MIHF chooses the first 2 bytes and the destination MIHF chooses the last 2 bytes. The Session ID is used in all MIH messages that are generated from the destination MIHF. The Session ID is valid only during the lifetime of the registration.

Transaction Identifier (Transaction ID) is an identifier that is used with every MIH message exchange. This is required to match each request message that is sent by the initiator and its response message. This Identifier can be created at the node initiating the transaction and is carried over within the fixed header part of the MIHF frame. In order to handle the case of duplicate transaction identifiers at the responding node, this identifier may be used in conjunction with the Session Identifier.

A Transaction Identifier (TID) can be used to match uniquely the received responses with the requests previously sent by the initiator. A session may involve multiple transactions. Since this identifier is present in most of the messages exchanged using MIHF frames, the TID is located within the fixed header part of the MIHF frame.

A Transaction ID can be a 16 bits length identifier that is unique to a session between the sender and the receiver. For example, this could be an integer that starts from zero (0) and incremented by one (1)(modulo $2^{16}$) every time a new Transaction ID is generated.

A re-registration request is a registration request using the SessionID for an existing registration.

According to the preferred embodiments, a session identifier is used for identifying an MIH registration session across different MIH transport instances between a pair of communicating MIHFs.

Scenarios:

MIHF at MN with multiple interfaces may use multiple transport protocol instances to communicate with an MIHF in the network Point of Service (PoS) or non-PoS MIH), for example:

A. One TCP, UDP or SCTP instance and one Ethertype transport instance.

B. Multiple Ethertype instances.

C. Multiple TCP, UDP or SCTP instances.

The MIHF in the network can associate multiple different transport instances with the same MIHF at MN, as for example:

Case 1: Single MIHF Hops

A. A PoS needs to maintain a single registration state for the MN across multiple transport instances B. The transport instances of the MN is visible to the PoS.

FIG. 1 is an illustrative architectural diagram related to a representation of a single MIHF hop.

Case 2: Multiple MIHF Hops

A. Each PoS that has a transport instance with a MN needs to maintain a single registration state for the MN for the transport instance (Same as Case 1) Each PoS relays a registration request towards the non-PoS MIHF.

B. In addition, a non-PoS MIH needs to maintain a single registration state for the MN across multiple PoSes relaying the registration requests.

C. The transport instances of MN are not visible to the non-PoS MIH.

Figure 2:
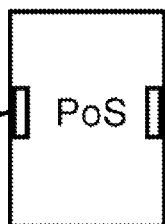
FIG. 2 is an illustrative architectural diagram related to a second case, in which there are multiple hops.
Figure 2:
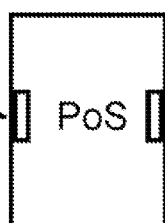

FIG. 2 is an illustrative architectural diagram related to a second case, in which there are multiple hops.

Illustrative Embodiments

Some of the preferred embodiments can involve some or all of the following: An MIHF at a MN needs to register with an MIHF in the network for specific event and command services. A MIHF at Mn with multiple interfaces may use multiple transport protocol instances to communicate with an MIHF in the network (PoS or non-PoS MIH), for example:

One TCP, UDP or SCTP instance and one Ethertype transport instance;

Multiple Ethertype instances;

Multiple TOP, UDP or SCTP instances.

An MIHF in the network can associate multiple transport instances of the same MIHF at MN with a registration as follows:

A. Define a session identifier (SessionID) that is assigned at the time of initial registration.

B. i) In a single-hop case, the sessionID is assigned by a PoS.

ii) in a multi-hop case the sessionID is assigned by a non-PoS MIH.

The session ID needs to be global unique to support multi-hop case.

C. The session ID is valid only during the lifetime of the registration.

D. Session-Id of the Diameter protocol [RFC 3588] is used as the session ID.

DiameterIdentity; <high 32 bits>; <low 32 bits>[;<optional value>]

E. An FQDN of the entity that creates the SessionID is the DiameterIdentity.

F. A registration state has at least a SessionID and local handles to the transport instances.

G. When sending and receiving MIH messages related to the registration, these transport instances are used, except that a SessionID is not carried in the initial registration request.

H. The same SessionID may or may not be shared among different services (e.g., Event Service and Command Service).

I. Multiple SessionIDs may be associated with the same transport instance.

J. When a MN or a PoS wants to add a new transport instance to the existing registration or delete an already associated transport instance from the existing registration, it re-registers with the registrar using the SessionID assigned to the registration.

K. "Add" indication is used for adding a new transport instance.

L. "Delete" indication is used for deleting a transport instance.

M. The "Add" or "Delete" indication is carried in the re-registration request,

N. A re-registration request will be sent over the transport instance to be added or deleted. A re-registration request is a request using the SessionID for an existing registration.

O. If "Add" or "Delete" indication is NOT carried in the re-registration request, the currently associated transport instance(s) is (are) replaced with the new transport instance.

In a multi-hop case, the "Add" or "Delete" indication for the first hop PoS may not be propagated to the next hop. In a single-hop case, a locally generated unique identifier within the entity that assigns it, can serve as a SessionID. In a multi-hop case, a local unique identifier may not work. A SessionID conflict can occur when different non-PoS MIHs assign the same SessionID for different registrations. This problem can be addressed as follows.

Define a session identifier (SessionID) that is assigned at the time of initial registration. In the case of a Single-hop the SessionID is assigned by a PoS, and in the case of a multi-hop, the SessionID is assigned by a non-PoS MIH. The SessionID is valid only during the lifetime of a registration. A registration state needs to have at least a SessionID and local handles to the transport instances.

When sending and receiving MIH messages related to the registration, the SessionID and the transport instances are used, except that a SessionID is not carried in the initial registration request.

The same SessionID may or may not be shared among different services (e.g., Event Service and Command Service). Multiple SessionIDs may be associated with the same transport instance. When a MN or a PoS wants to add a new transport instance to the existing registration or delete an already associated transport instance from the existing registration, it re-registers with the registrar using the SessionID assigned during registration.

"Add" indication is used for adding a new transport instance and "Delete" indication is used for deleting a transport instance. The "Add" or "Delete" indication is carried in the re-registration request. A re-registration request is a registration request using the SessionID for an existing registration. The re-registration request will be sent over the transport instance to be added or deleted.

If "Add" or "Delete" indication is NOT carried in the re-registration request, then the currently associated transport instance(s) is (are) replaced with the transport instance that carries the re-registration request.

In multi-hop cases, "Add" or "Delete" indication for the first hop PoS may not be propagated to the next hop.

BROAD SCOPE OF THE INVENTION

While illustrative embodiments of the invention have been described herein, the present invention is not limited to the various preferred embodiments described herein, but includes any and all embodiments having equivalent elements modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A method of media independent handover using a session identifier, comprising:
    providing a mobile node including a media independent handover function (MIHF) entity configured to register with a media independent handover function (MIHF) entity of a point of service within a network for specific event and command services, said mobile node using multiple transport instances employing multiple transport protocols to communicate via multiple interfaces of said mobile node with said MIHF entity of the point of service;
    said point of service maintaining a single registration state for said mobile node across said multiple transport instances, where the transport instances are visible to the point of service;
    defining a session identifier (session ID) that is assigned by said point of service at the time of initial registration, said session ID being valid only during the lifetime of the registration;
    said registration state including local handles to transport instances, and using said session ID and said transport instances when sending and receiving media independent handover messages related to said registration except that said session ID is not carried in the initial registration request; and
    using said session identifier for identifying an MIH registration session across different MIH transport instances between the MIHF entity of the mobile node and the MIHF entity of the point of service.

2. The method of claim 1, wherein a registration state includes local handles to transport instances, said transport instance being used when sending and receiving media independent handover messages related to said registration.

3. The method of claim 1, wherein the same SessionID is shared among different services.

4. The method of claim 3, wherein said services comprise at least one of event service and command service.

5. The method of claim 1, wherein multiple SessionIDs are associated with the same transport instance.

6. The method of claim 1, further comprising a mobile node or a point of service re-registering with a registrar using the SessionID assigned to the registration in order to add a new transport instance to the existing registration or delete an already associated transport instance from the existing registration.

7. The method of claim 6, wherein an "Add" indication is used for adding a new transport instance and a "Delete" indication is used for deleting a transport instance, and wherein said "Add" or "Delete" indication is carried in the re-registration request.

8. The method of claim 7, wherein said re-registration request is sent over the transport instance to be added or deleted.

9. The method of claim 7, wherein said "Add" or "Delete" indication is not carried in the re-registration request, and at least one currently associated transport instance is replaced with the new transport instance.

10. A method of media independent handover using a session identifier, comprising:
    providing a mobile node including a media independent handover function (MIHF) entity configured to register with a media independent handover function (MIHF) entity of a non-point of service (non-PoS) within a network for specific event and command services wherein said MIHF of said non-PoS within said network is multi-hops from said MIHF of said mobile node, said mobile node using multiple transport instances employing multiple transport protocols to communicate via multiple interfaces of said mobile node with said MIHF entity of the non-point of service;
    said non-point of service maintaining a single registration state for said mobile node across said multiple transport instances, where the transport instances are not visible to the non-point of service;
    defining a session identifier (session ID) that is assigned by said non-point of service media independent handover function entity, at the time of initial registration, said session ID being global unique to support multi-hop sessions;
    said registration state including local handles to transport instances, and using said session ID and said transport instances when sending and receiving media independent handover messages related to said registration except that said session ID is not carried in the initial registration request; and
    using said session identifier for identifying an MIH registration session across different MIH transport instances between the MIHF entity of the mobile node and the MIHF entity of the non-point of service.

11. The method of claim 10, wherein the session-Id of a diameter protocol is used as the session ID.

12. The method of claim 10, wherein each point of service that has a transport instance with a mobile node maintains a single registration state for the mobile node across multiple points of service relaying said registration requests.

13. The method of claim 10, wherein each point of service relays a registration request towards the non-point of service media independent handover.

14. A system for media independent handover using a session identifier, comprising:
　a mobile node including a media independent handover function (MIHF) entity configured to register with a media independent handover function (MIHF) entity of a point of service within a network for specific event and command services, said mobile node using multiple transport instances employing multiple transport protocols to communicate via multiple interfaces of said mobile node with said MIHF entity of the point of service;
　said point of service maintaining a single registration state for said mobile node across multiple transport instances;
　a session identifier (session ID) that is assigned by said point of service at the time of initial registration, said session ID being valid only during the lifetime of the registration;
　a registration state includes local handles to transport instances, said session ID and said transport instances being used when sending and receiving media independent handover messages related to said registration except that said session ID is not carried in the initial registration request; and
　wherein a session identifier is used for identifying an MIH registration session across different MIH transport instances between the MIHF entity of the mobile node and the MIHF entity of the point of service.

15. The system of claim 14, wherein a registration state includes local handles to transport instances, said transport instance being used when sending and receiving media independent handover messages related to said registration, multiple SessionIDs are associated with the same transport instance, and wherein the same SessionID is shared among different services.

16. The system of claim 14, further comprising a mobile node or a point of service re-registering with a registrar using the SessionID assigned to the existing registration in order to add a new transport instance to the existing registration or delete an already associated transport instance from the existing registration.

17. A method of media independent handover using a session identifier, comprising:
　providing a mobile node including a media independent handover function (MIHF) entity configured to register with a media independent handover function (MIHF) entity within a network for specific event and command services, said mobile node using multiple different transport instances employing multiple transport protocols to communicate via multiple interfaces of said mobile node with said MIHF entity within the network;
　said MIHF entity within said network associating said multiple different transport instances with the same MIHF entity of the mobile node by:

a) in a single hop MIHF case in which said MIHF entity within said network is an MIHF within a point of service, said point of service maintaining a single registration state for said mobile node across said multiple transport instances,
　　defining a session identifier (session ID) that is assigned by a point of service at the time of initial registration, said session ID being valid only during the lifetime of the registration, and
　　wherein said transport instances are visible to the point of service; and
　b) in a multi-hop MIHF case in which said MIHF entity within said network is an MIHF within a non-point of service, a plurality of point of services (PoSes) relaying registration requests from the mobile node to the non-point of service MIHF entity, and each said point of service (PoS) has at least one transport instance with said mobile node and maintains a single registration state for the mobile node across said at least one transport instance,
　　said non-point of service maintaining a single registration state for said mobile node across said multiple transport instances, with said non-point of service maintaining a single registration state for the mobile node across said plurality of point of services relaying the registration requests;
　　defining a session identifier (session ID) that is assigned by the non-point of service media independent handover function entity at the time of initial registration, said session ID being valid only during the lifetime of the registration, and said session ID being global unique to support multi-hop sessions, and
　　wherein said transport instances are not visible to the non-point of service; and
　c) wherein a registration state includes local handles to transport instances, and using said session ID and said transport instances when sending and receiving media independent handover messages related to said registration except that said session ID is not carried in the initial registration request;
　d) wherein the session identifier is used for identifying an MIH registration session across different MIH transport instances between the pair of communicating MIHFs of the MIHF entity of the mobile node and the MIHF entity of the point of service or non-point of service.

18. The method of claim 1, further including using a session-ID of a diameter protocol for the session ID.

19. The system of claim 14, wherein a session-ID of a diameter protocol is used for the session ID.

20. The method of claim 17, further including using a session-ID of a diameter protocol for the session ID.

21. The method of claim 1, further having the session ID assigned jointly by the mobile node MIHF and the point of service MIHF at the time of registration.

22. The method of claim 10, further having the session ID assigned jointly by the mobile node MIHF and the non-point of service MIHF at the time of registration.

23. The method of claim 17, further having the session ID assigned jointly by the mobile node MIHF and the MIHF entity within said network at the time of registration.

* * * * *